March 14, 1933.   E. W. CARPENTER   1,901,700
SHRUB PROTECTOR
Filed July 6, 1931
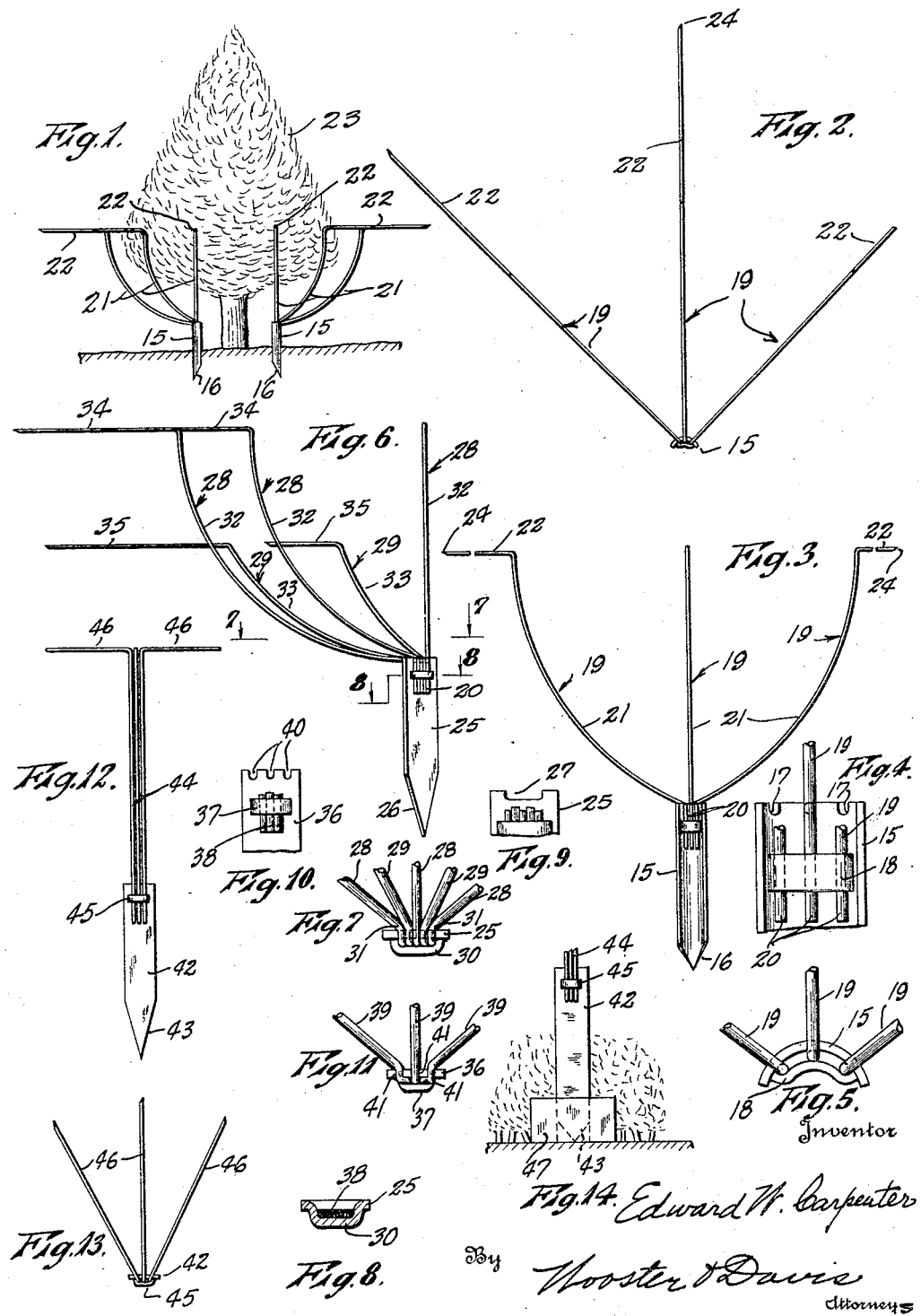

Patented Mar. 14, 1933

1,901,700

UNITED STATES PATENT OFFICE

EDWARD W. CARPENTER, OF FAIRFIELD, CONNECTICUT, ASSIGNOR TO THE E. W. CARPENTER MANUFACTURING COMPANY, OF BRIDGEPORT, CONNECTICUT, A CORPORATION OF CONNECTICUT

SHRUB PROTECTOR

Application filed July 6, 1931. Serial No. 548,741.

This invention relates to new and useful improvements in shrub protectors.

An object of the invention is to provide a shrub protector which is practically invisible and therefore not unsightly.

Another object is to provide a shrub protector which will not injure dogs but which will keep them away from shrubs, trees or the like and which will not tear clothes or injure persons.

Another object is to provide a device as and for the purpose stated and which will not interfere with the keeping of a lawn, as the mowing thereof, and which is so constructed that any desired number of the devices may be used about a tree or shrub.

An additional object is to provide a shrub protector which is efficient for the purpose intended and which is very inexpensive to manufacture and may therefore be sold at a low price.

Other objects and advantages will become apparent from a consideration of the following detailed description taken in connection with the accompanying drawing wherein satisfactory embodiments of the invention are shown. However, it should be understood that the invention is not limited to the details disclosed but includes all such variations and modifications as fall within the spirit of the invention and the scope of the appended claims to which claims reference should be had for a definition of the invention.

In the drawing:

Fig. 1 is an elevational view showing two of the protectors in position about a tree or shrub;

Fig. 2 is a plan view of the protector;

Fig. 3 is a rear elevational view thereof;

Fig. 4 is a detail view on an enlarged scale showing the connection between the wires and the support forming the improved shrub protector;

Fig. 5 is a plan view on an enlarged scale showing the connection between the wires and the support;

Fig. 6 is a side elevational view of a slightly modified form of protector;

Fig. 7 is a view taken substantially along the line 7—7 of Fig. 6 and looking in the direction of the arrows;

Fig. 8 is a sectional view on the line 8—8 of Fig. 6 and looking in the direction of the arrows;

Fig. 9 is a view showing the notched upper portion of the support of Fig. 6;

Fig. 10 is a view somewhat similar to Fig. 9 but showing a slightly modified support;

Fig. 11 is a view similar to Fig. 7 but showing the support of Fig. 10;

Fig. 12 is a rear elevational view of a further modified form of protector;

Fig. 13 is a plan view of the protector of Fig. 12; and

Fig. 14 is a view showing a means of mounting the protector over a walk or the like.

Referring in detail to the drawing and first particularly to Figs. 1 through 5 inclusive, the improved shrub protector is shown as comprising a support 15 preferably transversely curved and pointed or sharpened at one end as at 16 whereby it may be pressed into the ground. This support 15 is provided at its upper end with a plurality of spaced notches 17 the purpose of which will later appear. At a point below its upper end the support is lanced and has a strap like member 18 pressed rearwardly therefrom.

Mounted on the support 15 is a plurality of relatively fine highly flexible wires 19. The lower end portions 20 of the wires 19 are inserted between the body of the support and the strap-like member 18 and the said member is then pressed in the direction of the support whereby to clamp the end portions of the wires to the support. Above the end portions 20 the wires 19 may be looped or curved to provide intermediate outwardly and upwardly extending portions 21, and the wires beyond the portion 21 are bent to extend substantially horizontally as at 22.

It will be noted that the portions of the wires immediately above the lower end portions 20 pass through the notches 17 in the upper end of the support and are thereby held against turning movement on the support. Further, if the support is transversely curved the notches 17 will direct the wires radially of the support. Therefore, while the wires are relatively close at their inner ends the end portions 22 are spaced a considerable distance apart and each protector will therefore take care of or protect about one quarter of a tree or shrub. Four of the protectors could be used about a tree or shrub standing by itself, but when the plant to be protected is against a house or the like but two protectors will be needed.

From what has been said it will be understood that the improved protector is erected by pressing the pointed end 16 of the support 15 into the ground whereby to properly dispose the protector relative to a tree or shrub 23 (see Fig. 1). The wires 19 are bowed as at 21 in order that the device may be placed close to shrubs or trees having low branches and in this connection it is to be understood that while the device is described as a shrub protector it may be used to protect flowers, trees or the like.

The wires 19 are highly flexible and may be described as limber. However, their outer ends are somewhat sharp as at 24 whereby to sting a dog sufficiently to keep him away without doing him any injury. Moreover, the wires being very flexible will not injure a person and will not tear a dress or do other damage. Also since the wires are very thin they are practically invisible, and to keep the device from rusting it will preferably be Parkerized. Since Parkerizing turns steel black and the wires are small the device will be quite invisible. It therefore does not present an unsightly appearance as is the case with wire fences.

Obviously, the device is easily applied and may be moved about from place to place as required. Further it will be seen that the wires are disposed above the ground so as not to interfere with the keeping of a lawn or the like and that it is possible to work beneath the wires and pass a lawn mower beneath them, and it is not therefore necessary to remove the protectors each time a lawn is mowed or trimmed.

In Figs. 6 through 9 the improved protector is shown as including a support 25 formed of flat material and having a pointed end 26 to be pushed into the ground. At its upper end the support 25 has a relatively wide notch 27 adapted to receive a plurality of wires arranged in side by side relationship. Two sets of wires numbered respectively 28 and 29 are mounted on the support 25 and each wire has its inner or lower end passed beneath a strap-like member 30 lanced and pressed from the support. After the ends of the wires have been passed beneath the strap-like member 30, the same is pressed in the direction of the body of the support to clamp the wires to the support.

On passing through the notch 27 the two outside wires 28 are crimped or bent as at 31 whereby they incline in different directions and the two wires 29 are also crimped or bent although to a lesser degree than the outside wires 28. The third wire 28 or the middle wire 28 need not be crimped or bent. With the wires bent and extending radially of the support as probably best shown in Fig. 7 it will be appreciated that the outer ends of the wires are spaced apart a considerable distance whereby an appreciable area will be protected by the device.

The intermediate or bowed portions 32 of the wires 28 are shown as of greater length than the intermediate or bowed portions 33 of the wires 29. Therefore, the substantially horizontally disposed end portions 34 of the wires 28 are arranged above or at a greater distance from the ground than are the portions 35 of the wires 29. The purpose of this arrangement or the reason for this arrangement is that the lower wires or the shorter wires will take care of little dogs while the longer wires or the wires 28 will serve to keep away larger dogs.

Figs. 10 and 11 disclose a flat supporting member 36 having a strap-like member 37 lanced and pressed therefrom to receive and hold the end portions 38 of the wires 39. At its upper end the support 36 is provided with spaced notches 40 to receive portions 41 of the wires 39, and it will be noted that the outside wires 39 are bent or crimped immediately before and after passing through the notches 40 whereby to have the wires diverge and dispose their outer ends in spaced relation in order that the protector may serve to protect an appreciable area. The notches 40, of course, serve to prevent the wires 39 turning on the support.

Figs. 12 and 13 show a protector particularly adapted for use in connection with flowers. This protector includes a support 42 formed of flat material and having a pointed end 43 adapted to be pressed into the ground. Wires 44 are carried by the support 42 and have their lower end portions passed beneath a strap-like member 45 corresponding with the strap-like members 18, 30 and 37 before referred to. The wires 44 are not bowed but extend vertically and have their upper end portions 46 disposed in diverging relationship and radially with respect to the support.

It will be understood that each of the various protectors may be formed of steel and Parkerized to blacken it and prevent rust, and it will further be understood that it is preferred that the wires be of small diameter and somewhat pointed at their free ends and of flexible nature so as not to cause any serious injury either to persons or to dogs and so as not to tear clothes, but be sufficiently sharp to sting a dog sufficiently so he will not like it and will keep away.

Fig. 14 discloses the mounting of the improved protector shown as the protector of Figs. 12 and 13, in a block 47 which may be of wood or concrete or of metal. This form of mounting may be used in preference to sticking the supporting element into the ground should it be feared that the element might cut roots or the like in any particular instance or the supporting block 47 may be used when it is necessary to mount the protector above a walk or other surface into which the support may not be pushed.

It will of course be evident that, although the laterally extending portions 22, 34, 35 and 46 are shown as being straight, the same effect would be secured if they are somewhat curved so long as the pointed end extends laterally so as to give the desired contact with a dog to keep him away.

Having thus set forth the nature of my invention, what I claim is:

1. In a shrub protector, a support, a plurality of wires each having an end anchored to said support, each of said wires including a bowed intermediate portion extending outwardly and upwardly from said support and a free end portion extending from the intermediate portion and radially and outwardly of the support.

2. In a shrub protector, a support, a plurality of wires mounted on said support, and each of said wires including an intermediate portion extending upwardly from the support and a free end portion extending from the intermediate portion and radially and outwardly with respect to the support.

3. In a shrub protector, a support to be positioned adjacent the shrub, a plurality of wires mounted on the support, each of said wires having a free end portion extending laterally with respect to said support and outwardly away from the shrub, and said support comprising an element pointed at one end and adapted to be partially pressed into the ground.

4. In a shrub protector, a support, a plurality of wires mounted on said support, said support having a notched upper end, one of said wires having a portion extending through the notch whereby the wire is held against turning movement on the support, and each of said wires having a free end portion extending laterally with respect to the support.

5. In a shrub protector, a support, a plurality of wires mounted on said support, said support having a plurality of spaced notches in one of its ends, each of said wires arranged with a portion in one of said notches whereby the wires are held against turning movement on the support and each of said wires having a free end portion extending laterally with respect to the support.

6. In a shrub protector, a support, a plurality of wires mounted on said support, said support having a plurality of spaced notches in one of its ends, said support pointed at its other end and adapted to be pressed into the ground, each of said wires arranged with a portion in one of said notches whereby the wires are held against turning movement on the support, and each of said wires having a free end portion extending laterally of the support.

7. In a shrub protector, a support, a plurality of wires mounted on said support, said support having a plurality of spaced notches in one of its ends, said support pointed at its other end and adapted to be partially pressed into the ground, each of said wires arranged with a portion extending through one of said notches whereby the wires are held against turning movement on the support, and said support transversely curved at its notched end whereby to cause the wires to extend radially of the support when portions of the wires are in the said notches.

In testimony whereof I affix my signature.

EDWARD W. CARPENTER.